(12) United States Patent (10) Patent No.: US 8,892,562 B2
Renders et al. (45) Date of Patent: Nov. 18, 2014

(54) CATEGORIZATION OF MULTI-PAGE DOCUMENTS BY ANISOTROPIC DIFFUSION

(75) Inventors: Jean-Michel Renders, Quaix-en-Chartreuse (FR); François Ragnet, Venon (FR); Damien Cramet, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 249 days.

(21) Appl. No.: 13/558,814

(22) Filed: Jul. 26, 2012

(65) Prior Publication Data

US 2014/0032558 A1 Jan. 30, 2014

(51) Int. Cl.
*G06F 17/30* (2006.01)

(52) U.S. Cl.
USPC .......................................... 707/740; 707/754

(58) Field of Classification Search
USPC .......................... 707/737, 740, 802, 709, 754
See application file for complete search history.

(56) References Cited

U.S. PATENT DOCUMENTS

| | | | |
|---|---|---|---|
| 6,205,247 B1 * | 3/2001 | Breuer et al. .................. | 382/228 |
| 2003/0021481 A1 | 1/2003 | Kasutani | |
| 2003/0130993 A1 | 7/2003 | Mendelevitch et al. | |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0240572 A1 | 10/2008 | Hoshii | |
| 2008/0317358 A1 | 12/2008 | Bressan et al. | |
| 2009/0144033 A1 | 6/2009 | Liu et al. | |
| 2010/0040285 A1 | 2/2010 | Csurka et al. | |
| 2010/0082615 A1 * | 4/2010 | Clinchant et al. ............. | 707/728 |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |
| 2010/0191743 A1 | 7/2010 | Perronnin et al. | |
| 2010/0226564 A1 | 9/2010 | Marchesotti et al. | |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |
| 2011/0091105 A1 | 4/2011 | Perronnin | |
| 2011/0192894 A1 | 8/2011 | Ragnet et al. | |
| 2011/0200256 A1 | 8/2011 | Saubat et al. | |
| 2011/0276589 A1 * | 11/2011 | Smith et al. ................... | 707/769 |
| 2012/0127540 A1 | 5/2012 | Moore et al. | |
| 2013/0151957 A1 * | 6/2013 | Kuroiwa ........................ | 715/256 |

OTHER PUBLICATIONS

Barash, D. "Bilateral filtering and anisotropic diffusion: towards a unified viewpoint", Hewlett-Packard Company, 2000, pp. 1-12.
Duh, K. "Jointly Labeling Multiple Sequences: A factorial HMM Approach", Proc. of the ACL Student Research Workshop, 2005, pp. 19-24.

(Continued)

*Primary Examiner* — Marc Filipczyk
(74) *Attorney, Agent, or Firm* — Fay Sharpe LLP (57) ABSTRACT

A computer implemented system and method are provided for refining category scores for pages of a sequence of document pages that potentially includes document boundaries. The method uses initial category scores provided by a categorizer that considers one page at a time or concatenated pairs of pages (called bipages). The category scores represent the probability that a page belongs to a particular category. The method uses anisotropic diffusion to refine the initial page category scores using the scores of neighboring pages as a function of the probability that there is a boundary between the pages. The method may be performed iteratively.

20 Claims, 5 Drawing Sheets

(56) References Cited

OTHER PUBLICATIONS

Gonfaus, J., et al. "Harmony potentials for joint classification and segmentation", XX.
Gordo, A., et al. "A bag-of-pages approach to unordered multi-page document classification", 2010 IEEE, pp. 1920-1923.
Macskassy, S., et al. "Classification in Networked Data: A toolkit and a univariate case study", 2007, Journal of Machine Learning Research 8, pp. 935-983.
Ravichandran, A., et al. "A unified approach to segmentation and categorization of dynamic textures", 1-14.
Zimmermann, M., et al. "Toward joint segmentation and classification of dialog acts in multiparty meetings", 1-7.
Frasconi, et al. "Hidden Markov Models for Text Categorization in Multi-Page Documents", Journal of Intelligent Information Systems, 2002, 18:2/3, pp. 195-217.
Barash, D. "A Fundamental Relationship between Bilateral Filtering, Adaptive Smoothing and the Nonlinear Diffusion Equation", IEEE Trans. on Pattern Analysis and Machine Intelligence, vol. 24, No. 6, Jun. 2002, pp. 1-5.
Ravichandran, A., et al. "A unified approach to segmentation and categorization of dynamic textures", Proceedings of ACCV'10, Lecture Notes in Computer Science, Springer 2010, p. 425-438.
Zimmermann, M., et al. "Toward joint segmentation and classification of dialog acts in multiparty meetings", Proceedings of MLMI'05, vol. 3869, Lecture Notes in Computer Science, Springer 2005, p. 187-193.
Gonfaus, J., et al. "Harmony potentials for joint classification and segmentation", Proceedings of CVPR'10, IEEE 2010, p. 3280-3287.
Ghahramani, et al. "Factorial hidden Markov models", Machine Learning, 1996, 29:245.
Sen, et al. "Collective classification in network data", Al Magazine, 2008, 29(3):93-106.

\* cited by examiner

CATEGORIZATION OF MULTI-PAGE DOCUMENTS BY ANISOTROPIC DIFFUSION

BACKGROUND

The exemplary embodiment relates to document processing and finds application in connection with the categorization of scanned document pages in cases where document boundaries exist between some of the pages.

To provide electronic access and storage of documents, paper documents are often scanned in batches and indexed. Document processing service providers often receive large volumes of documents (hundreds of thousands or even millions of pages per day) from customers, either physically or electronically, and assign a document type (doctype) according to a customer-defined taxonomy to each document and perhaps extract relevant information such as customer number or other details. Boundaries between documents may also be detected, often based on the doctype, segmenting the stream of pages into discrete documents. Generally, humans review only a small portion of the pages of the documents, while the rest can be categorized automatically without human intervention. For the service provider, having even a small proportion of the pages manually reviewed adds significantly to the cost.

Traditionally, document segmentation based on categorization has been addressed with techniques such as Markov Random Fields, including Hidden Markov Models (HMM) and Factorial Hidden Markov Models, or Collective Classification, which is related to Markov Random Fields. An HMM can be applied to image data, generally by building feature vectors, or to textual information acquired by optical character recognition (OCR). An HMM can also be applied to both textual and image data, called a hybrid approach, by either applying a model to both OCR data and image data or by combining the output of a textual model and an image model.

Automated document recognition (ADR) systems have been developed which perform document or page type recognition for scanned document pages. For example, Paolo Frasconi, Diovanni Soda, and Alessandro Vullo, "Text categorization for multi-page documents: A hybrid Naïve Bayes HMM approach," in ACM/IEEE Joint Conference on Digital libraries, (JCDL) 2001, disclose a method to classify pages of sequential OCR text documents using hidden Markov models. The taxonomy of Frasconi, et al., is defined for pages, not for documents, with classes such as "title-page," "table-of-content-page," "index-page," etc., so that a document consists of pages with different types. The HMM models the most likely sequences of page types to form a consistent document.

Standard categorization techniques consider pages in isolation and therefore do not leverage the fact that subsequent pages are very likely to bear the same category. Frequently, pages of a document are labeled with an incorrect doctype, which in turn can cause the automated system to break a document improperly into several documents or to run two unrelated documents together, which therefore need to be indexed by a human. Grouping the pages of a document is referred to as document segmentation or document reconstruction. One way to segment documents is to physically segment the flow of pages with document separations in the paper flow. When documents are received, slipsheets (or stamps) are added to mark the first page of each document. The separators are machine-recognizable. Thus, when a single page of a document is recognized, the full document (all pages between the two separations) can be assigned to that category. Alternatively, the categorization is applied at the document level (all pages between two separators are categorized as "one" document) which can deliver much better performance than taking each page in isolation. This separation can also be performed on electronic documents. Whether done on the physical pages or electronically, the gains in categorization performance are usually offset by the additional separation costs, such as paper and printing costs; manipulation, insertion, and removal of the slipsheet; or additional storage costs.

One problem with physical segmentation, therefore, is that it is not cost effective in most cases. Adding the separator sheets is manually intensive. A second problem is that many of the documents arrive from the customer in bulk, and document separation information is unavailable. Other techniques include handcrafted rules to establish/reconstruct page sequence information, trying to fill in some gaps. In practice however, these techniques achieve low recognition improvements and usually bring many false positives.

There remains a need for a system which automatically identifies document boundaries in bulk collections of digital documents.

REFERENCES

Automated document processing systems are described in U.S. Pub. No. 20120127540, published May 24, 2012, entitled DOCUMENT SEPARATION BY DOCUMENT SEQUENCE RECONSTRUCTION BASED ON INFORMATION CAPTURE, by John A. Moore, et al.; U.S. Pub. No. 20110192894, published Aug. 11, 2011, entitled METHOD FOR ONE-STEP DOCUMENT CATEGORIZATION AND SEPARATION, by Francois Ragnet, et al.; and U.S. Pub. No. 20110200256, published Aug. 18, 2011, entitled OPTICAL MARK CLASSIFICATION SYSTEM AND METHOD, by Nicolas Saubat, et al., U.S. Pub. No. 20030130993, published Jul. 10, 2003, entitled DOCUMENT CATEGORIZATION ENGINE, by Ofer Mendelevitch, et al., the disclosures of all of which are incorporated herein by reference in their entireties.

BRIEF DESCRIPTION

In accordance with one aspect of the exemplary embodiment, a computer implemented categorization method of assigning page category scores to a plurality of pages includes receiving a sequence of pages to be categorized. For each of a plurality of pages in the sequence as a current page, a page category score for each of a set of categories for the current page is computed. A first bipage category score is computed for each of the set of categories for a first bipage comprising a preceding page and the current page. A second bipage category score is computed for each of the set of categories for a second bipage comprising a subsequent page and the current page. A first boundary probability is computed, which is the probability of there being a document boundary between the preceding page and the current page. A second boundary probability is computed, which is the probability of there being a document boundary between the subsequent page and the current page. For at least one iteration, for each of the plurality of pages, a refined page category score for each of the set of categories for the current page is computed as a function of the first bipage category scores, weighted by a first weighting factor and the second bipage category scores, weighted by a second weighting factor, and the page category scores of the current page. The first weighting factor is based on the first boundary probability. The second weighting factor is based on the second boundary probability. The refined page category scores can be refined further in a further iteration. Information based on the refined page category scores for each of the plurality of pages is output.

In another aspect of the exemplary embodiment, a computer-implemented document categorization system includes a categorizer which computes a page category score for each of a set of categories for each page of a plurality of pages, based on a digital representation of the respective page. A concatenator concatenates representations for successive pairs of the plurality of pages for generating a bipage category score for each of the set of categories for each bipage of a plurality of bipages, where each page other than the first is part of a preceding bipage and each page other than the last is part of a subsequent bipage. A boundary detector computes a boundary probability for successive pairs of the plurality of pages such that each page other than the first has a preceding boundary probability between the page and its preceding page and each page other than the last has a subsequent boundary probability between the page and its subsequent page. A score refiner computes a refined page category score for each of the set of categories for each page P of the plurality of pages as a function of the bipage category scores of the preceding bipage of P weighted by a first weighting factor, the first weighting factor being based on the preceding boundary probability of page P, the bipage category scores of the subsequent bipage of P weighted by a second weighting factor, the second weighting factor being based on the subsequent boundary probability of page P, and the page category scores of the page P. The refined page category scores can be refined further in a further iteration. A processor implements at least one of the concatenator, categorizer, boundary detector, and score refiner.

In another aspect, a computer implemented categorization includes receiving a sequence of pages to be categorized, and for each page of a plurality of pages in the sequence, computing a page category score for at least one category. For each pair of consecutive pages in the sequence of pages a bipage category score for the at least one category is computed. A boundary probability is computed for each pair of consecutive pages in the sequence of pages. For each current page of the plurality of pages, a refined page category score is computed for each of the at least one category for the current page as a function of the page category score, the bipage scores of bipages in which the page is one of the pair of consecutive pages, and the boundary probabilities. Final category scores, based on the refined page category score for each current page, are output.

DETAILED DESCRIPTION

The exemplary embodiment relates to a system and method for document page categorization in multi-page, multi-document collections. Aspects of the exemplary embodiment provide for categorizing documents based on anisotropic diffusion.

The page sequences in scanned document collections often come from consistent documents, and two successive pages are likely to belong to the same category. The documents are typically many pages long, often tens of pages, sometimes hundreds. The present method takes advantage of the fact that when categorizing sequences of pages in many settings, the sequences of pages are not independently, identically distributed (iid) data.

The accuracy of a document categorizer can thus be improved by taking advantage of the category correlation between sequential pages. Taking into account surrounding pages not only improves performance with respect to a given page, but also improves document boundary detection.

In the exemplary embodiment, a machine-learning based method is used for assigning category information to individual pages that were previously uncategorized. The method considers a pair of sequential (neighboring) pages, referred to herein as a bipage, as the input to an adaptive smoothing technique. The smoothing technique is based on anisotropic diffusion, which assumes that category decisions for a previous and subsequent page influence the category decision for a current page, while also taking into consideration the likelihood that there may be a page boundary between two pages, where the assumption is generally not applicable (i.e., anisotropic). The effect of a smoothing function is therefore reduced based on the probability that a boundary exists between two pages.

Benefits of the present method include increased automatic page coverage as well as accuracy improvements. As will be appreciated, even moderate categorization improvements can produce large savings, once multiplied by the number of images processed daily by a typical service provider. For such applications, the goal of particular interest is to optimize business performance measures, specifically the percentage of the page stream that can be automatically processed without any human supervision at a defined level of precision.

Figure 1:
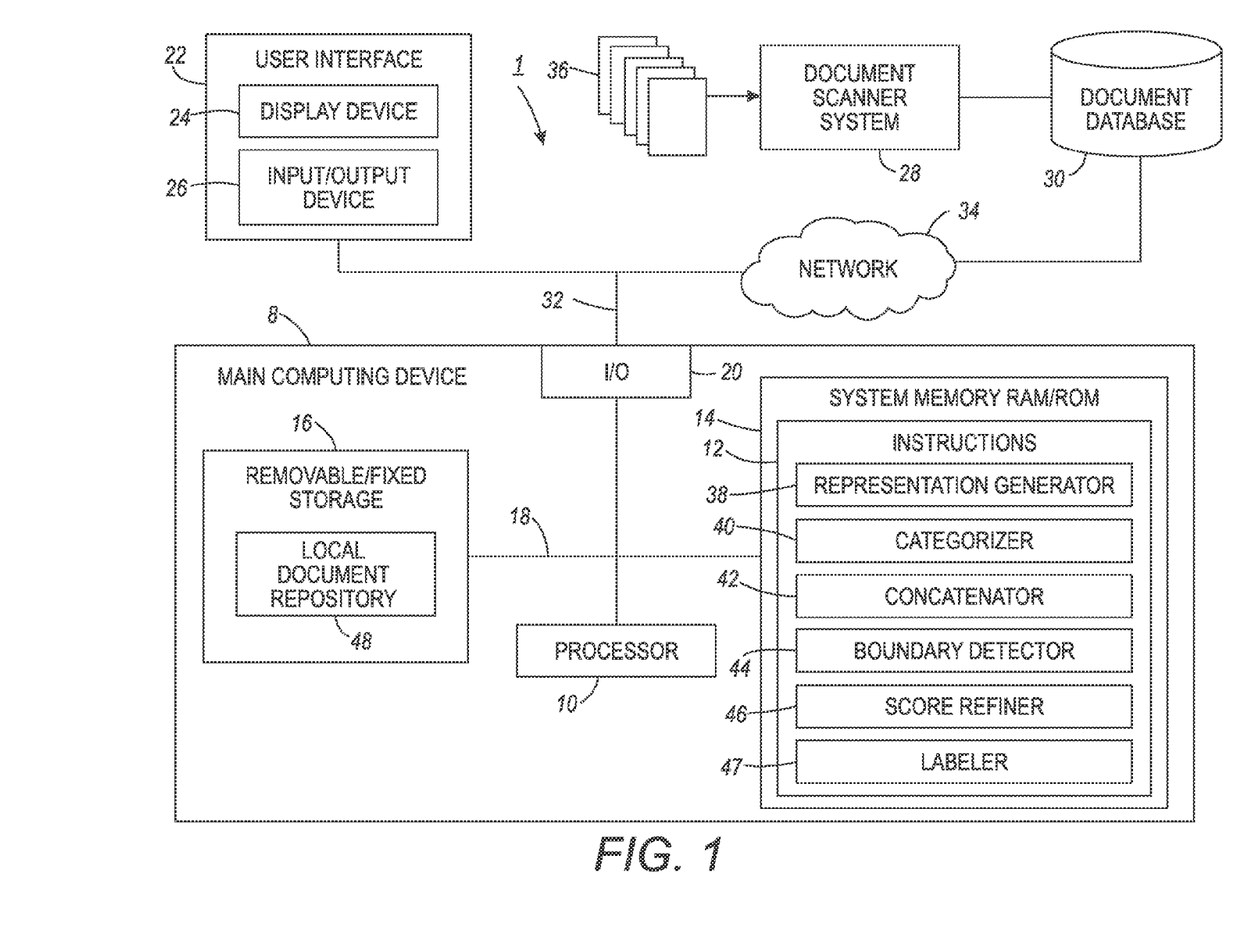
FIG. 1 depicts a functional block diagram of a system for categorizing pages of documents according to one aspect of the exemplary embodiment.

With reference to FIG. 1, a functional block diagram of a computer-implemented categorization system 1 suitable for performing the exemplary method disclosed herein is shown in an operating environment. As will be appreciated, separate computer systems may be configured and connected to parallelize the categorization system. The illustrated categorization system includes a computing device 8 including a processor 10, which controls the overall operation of the computing device 8 by execution of processing instructions 12 which are stored in a memory 14 connected to the processor 10 by a bus 18. The processor 10 executes instructions 12 for performing the exemplary method outlined in FIGS. 3 and 4. The processor is connected to a memory storage unit 16 which may be removable or fixed.

System 1 also includes one or more interfaces to connect the computing device 8 to external devices, including an input output (I/O) interface 20. The I/O interface may communicate with a user interface 22, such as a client computing device. The user interface 22 may include one or more of a display device 24 for displaying information to users, such as an LCD screen, and a user input device 26, such as a keyboard or touch or writable screen, and/or a cursor control device, such as a mouse, trackball, or the like, for inputting instructions and communicating user input information and command selections to the processor 10 and/or to a processor of the client device. The I/O 20 links the computing device 8 with external devices, such as the illustrated remote document database 30, via a wired or wireless link 32. For example, I/O 20 may communicate with a network 34, which links the main computing device to other computing systems such as a server computer hosting the database 30.

The computing device 8 may include a PC, such as a desktop, a laptop, palmtop computer, scanner, portable digital assistant (PDA), server computer, cellular telephone, pager, or other computing device or devices capable of executing instructions for performing the exemplary method or methods described herein.

The system memory 14 and storage memory 16 may be separate or combined and may represent any type of non-transitory computer readable medium such as random access memory (RAM), read only memory (ROM), magnetic disk or tape, optical disk, flash memory, or holographic memory. In one embodiment, the memory 14, 16 comprises a combination of random access memory and read only memory. In some embodiments, the processor 10 and memory 14 and/or 16 may be combined in a single chip. The I/O interface 20 of the computer system 1 may include a network interface card to communicate with other devices via computer network 34, such as a local area network (LAN), a wide area network (WAN), or the Internet, and may comprise a modulator/demodulator (MODEM). The digital processor 10 can be variously embodied, such as by a single core processor, a dual core processor (or more generally by a multiple core processor), a digital processor and cooperating math coprocessor, a digital controller, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions. The database 30 may be hosted on a remote computing system similarly configured to the main computing device 8, i.e., which may include memory and a processor.

The system 1 receives as input a set of electronic document pages 36 to be categorized. In general, the set of pages comprises a sequence of scanned pages generated by the document scanning system 28 by scanning multiple documents. It is therefore to be expected that the scanned pages comprise a plurality of documents. However, the set of pages is input to the system without any added machine-detectable inter-document separators, such as scanned slipsheets or stamps. The document pages may include images, text, or a combination thereof. The pages may be in any suitable format, such as PDF, JPEG, GIF, JBIG, BMP, or TIFF and may be converted to another format for processing. The page sequence may be generated by other means than scanning. For example, the page sequence may comprise only electronic documents.

The instructions 12 may include various software components, such as a representation generator 38, a page categorizer 40, a concatenator 42, a document boundary detector 44, a document score refiner 46, and a labeler 47.

Data, in the form of document pages 36, is stored in the document database 30 or a local document repository 48 in memory 16. The local document repository 48 may store document pages that have been retrieved from the document database 30 that are in the process of being categorized.

Figure 2:
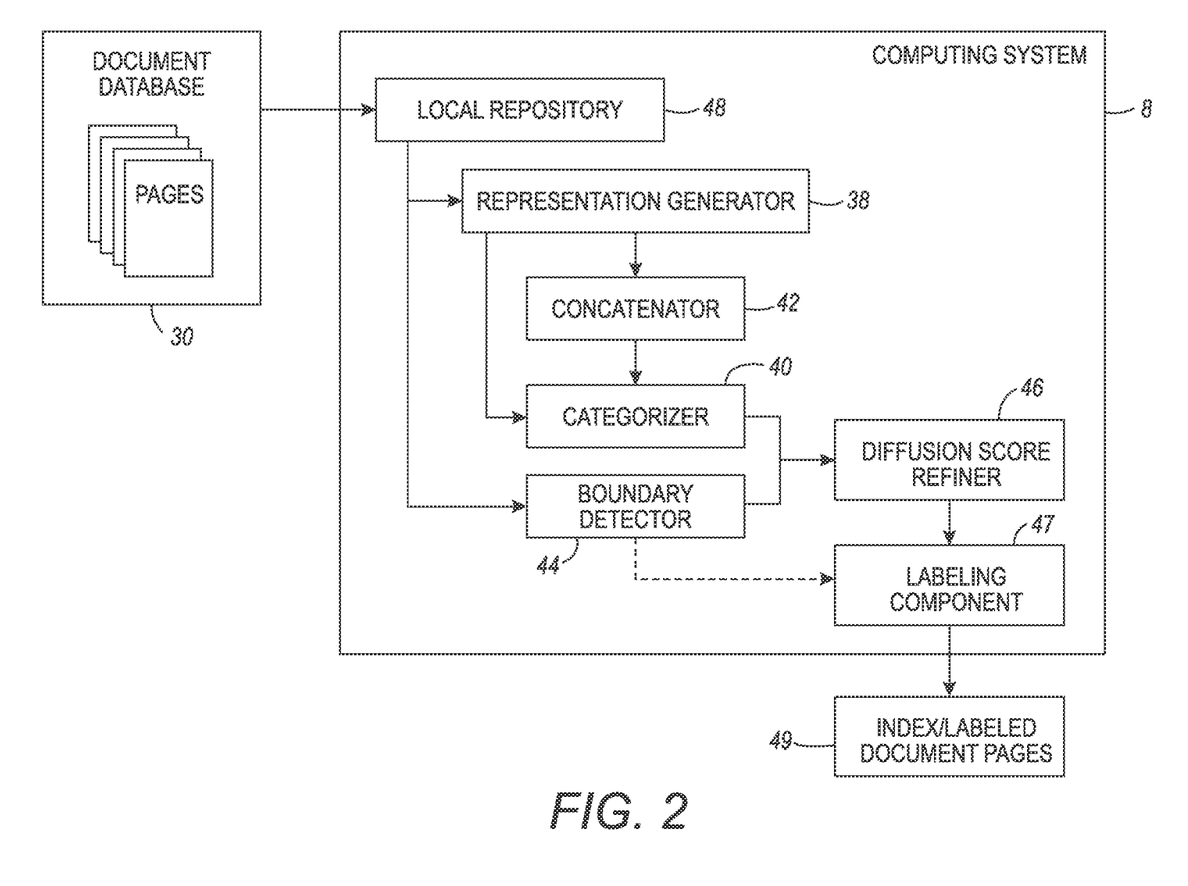
FIG. 2 depicts a functional block diagram of software components and data flow in a system for categorizing pages of documents.

FIG. 2 is a software architecture view of data flow within the software components of the system 8. Document pages are stored in document database 30 for categorization. As those skilled in the art will understand, the documents may be stored remotely and transferred to the main computing system by network or the database may be on the same machine 8 as the categorizing system. It is also contemplated that the different software components 38, 40, 42, 44, 46, and 47 are located on different machines. The arrangement of FIG. 2 is exemplary. The system of FIG. 2 stores the database 30 on a separate machine and fetches batches of documents to be stored in local repository 48 for processing by the categorizing system. Information 49 output by the system may include indexed and/or labeled document pages.

The representation generator 38 generates a representation of each document page in the set of pages 36 and stores it in memory. The representation may be in the form of a multi-dimensional fixed length feature vector, which serves as a statistical representation of features extracted from the document page. The feature vector can be generated from page information such as textual features, visual features, or both (a hybrid approach). For textual features, a Bag-of-Words representation based on text identified by an optical character recognition (OCR) engine, may be used. A histogram of word counts is computed, which may be normalized to account for the fact that some words occur with high frequency in most documents, and thus form the feature vector. In the cases of visual features, these may be based on low level features, such as color and gradient features, extracted from small patches of the image. Various methods exist for generating representations based on visual features, such as the Bag-of-Visual Words and the Fisher vector. See, for example, U.S. Pub. Nos. 20030021481; 2007005356; 20070258648; 20080069456; 20080240572; 20080317358; 20090144033; 20100040285; 20100092084; 20100098343; 20100226564; 20100191743; 20100189354; 20100318477; 20110040711; 20110026831; 20110052063; and 20110091105; the disclosures of which are incorporated herein by reference in their entireties. Other features which may be extracted include layout features, such as the arrangement of blocks of text on the page.

The categorizer 40 receives individual page representations from the representation generator 38 and assigns a score vector containing scores corresponding to the likelihood that the page is part of a document of each category (doctypes) of a selected taxonomy. The categorizer also receives representations of pairs of sequential pages (bipages) from the concatenator 42 and assigns a score vector to the bipage for the same finite set of categories. The categorizer may store the score vectors (individual and bipage) in memory 14.

The exemplary categorizer 40 serves as a "local" (individual page) categorizer that assigns a classification score for each of the categories of the taxonomy. In the case of a machine learning based categorizer, it may be trained on a set of training pages which have each been assigned a label corresponding to one of the categories. The categorizer learns a categorization model, or a set of models, one for each category, which, given an unlabeled page, assign(s) category scores. As will be appreciated, the categorizer 40 is imperfect for several reasons, such as noise in the input features, noise in the labels of the training set, model misspecification, and the like.

The exemplary categorizer 40 is configured for receiving as input the representation of a single page from the representation generator 38 and computing the classification score for each category based thereon, without reference to the representations of any other pages. The classification scores can be stored in memory 14 as a vector of category scores, each category score correlated to the probability that the document page is from a particular document category. In categorizing a single page, the categorizer does not use categorization information from neighboring pages in assigning the category scores for a current page.

The accuracy of the categorizer 40 can be increased by using a pair of consecutive pages (bipage), in addition to the single pages, as objects to be categorized. When the consecutive pages of the bipage are from the same document, the bipage categorization scores are more accurate because the scores are derived from less sparse input, especially when one of the pages is nearly empty. The exemplary categorizer 40 is thus configured to take as input a representation of a bipage, which may be an aggregation of the representations of the pages forming the bipage, and output a categorization score for each of the categories for the bipage. For example, the concatenator 42 retrieves pairs of sequential pages and then concatenates or otherwise aggregates their feature vectors together so that they may be processed by the categorizer 40.

Figure 5:
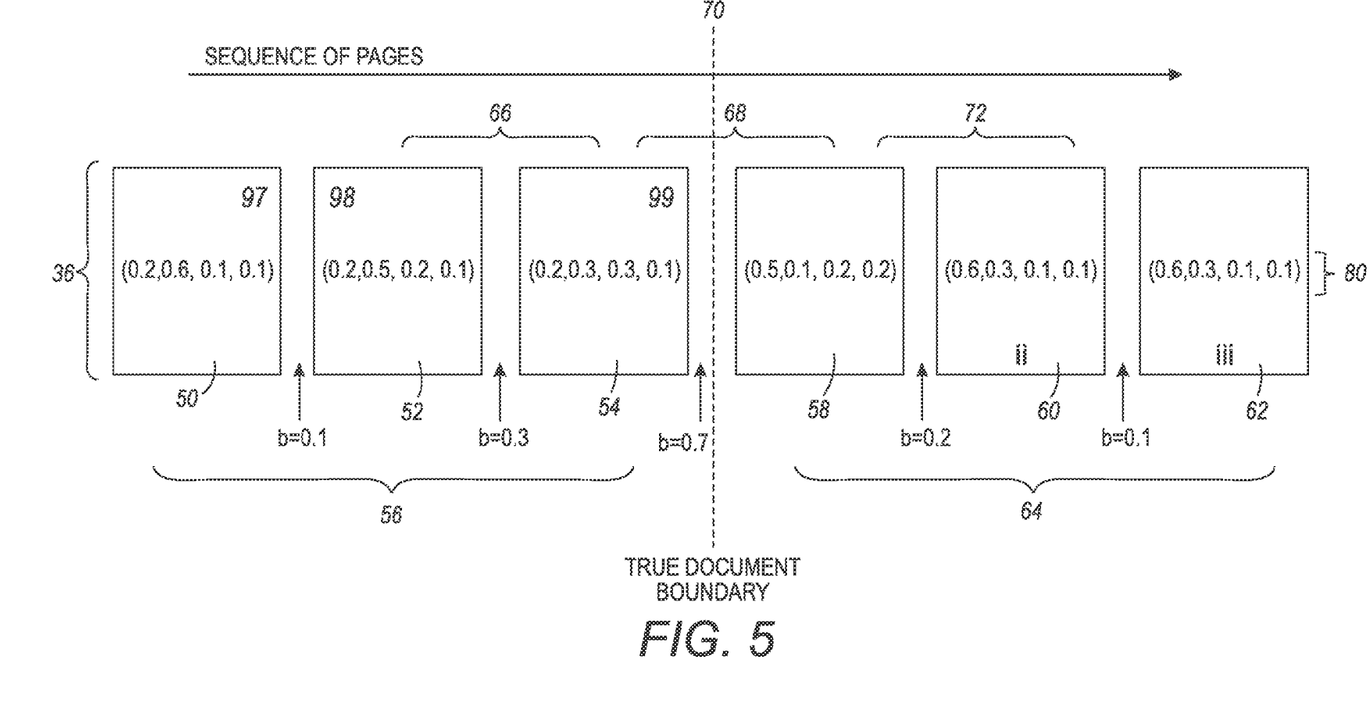
FIG. 5 is a diagrammatic representation of exemplary pages and category vectors of a document to be classified.

For example, FIG. 5 illustrates part a sequence of pages 36 to be categorized. Pages 50, 52, 54 constitute the last three pages of one document 56 and pages 58, 60, 62 constitute the first three pages of another document 64. A first bipage 66 includes immediately adjacent pages 52 and 54, which happen to be from the same document 56. The information from page 52 is helpful in categorizing page 54, since it has little text, being the last page of the document. A second bipage 68 includes immediately adjacent pages 54 and 58, which are at the document boundary 70 (which is unknown to the system) and are thus from different documents 56, 64. As an example, they could be a form and an accompanying letter, or two different forms, which have little in common and should be assigned different category labels. A third bipage 72 includes pages 58 and 60, from the same document 64.

As will be appreciated, the bipage scores are only more accurate if the two pages of the bipage belong to the same document 56, 64. In the exemplary embodiment, the bipage scores are weighted based on a computed probability that the pages in a bipage are from the same document. This can increase the categorizer's accuracy. The weighting of the bipages is performed by the document boundary detector 44, which may also serve as a first page and a last page detector. The document boundary detector 44 outputs a score quantifying the likelihood that two consecutive pages belong to the same document. The boundary detector may use the output from the categorizer as part of its input, or it may be independent of the categorizer. The boundary detector 44 may include a boundary detection model which has been trained on labeled document pages where the labels indicate whether the page is at a document boundary or not. Like the categorizer model(s), the boundary detection model is also imperfect, for similar reasons. The boundary detector 44 retrieves pairs of pages and assigns a value to the pair corresponding to the likelihood that the pages are from different documents (or from the same document). For example, for each page in the sequence, the document boundary detector 44 outputs a first boundary probability that there is a document boundary between the immediately preceding page in the sequence and the current page and a second boundary probability that there is a document boundary between the immediately subsequent page and the current page.

The score refiner 46 takes the output of the categorizer 40 and the probabilities output by the boundary detector 44 and produces a new (refined) classification score for each doctype (category) of the taxonomy for each page. The accuracy of doctype recognition is refined by combining the output of the two local models 40, 44, using anisotropic diffusion. In some embodiments, the refined doctype classification scores may also be used to refine the output of the boundary detector 44. Anisotropic diffusion iteratively smoothes the category scores by propagating the scores to neighboring pages while respecting the boundary information from the boundary detector, producing a globally more refined (better) estimation of category scores.

The score vectors for the individual pages and bipages, as well as the boundary likelihood value, are used by the diffusion score refiner 46 to refine the score vectors of the individual pages, producing a new score vector for each page. The new score vectors can then be used by the labeling component 47 to index (label) the individual document pages and to segment the sequence of pages into documents 56, 64. The score vectors and labels may be stored in memory 14, in storage 16, or in the document database 30 with the respective page.

Experimental results show that, for an evaluation collection (a collection of completed application forms), the exemplary method is fast and efficient, with improved business-oriented performance measures. It dramatically improves the categorization performance with respect to a standard local categorizer and also outperforms much more complex and computationally intensive approaches such as factorial hidden Markov models or message-passing based algorithms.

Assume that the system 1 receives, from the document database 30, a sequence of N pages $(x_1, x_2, \ldots, x_N)$ to be classified. The categorizer 40 produces a doctype score vector of K rows and 1 column, one value for each of the K doctypes of the given taxonomy. The doctype score vector of a page $x_k$ will be denoted by $s_c(x_k)$ and may be stored in memory 14, storage 16, or the document database 30. This score vector is obtained using the categorizer model $s_c(x)$ which as noted above, has been trained on some representative training data that has already been accurately categorized.

To apply the categorizer model to bipages, concatenator 42 combines the two pages and the model is then applied to the feature vectors produced by the concatenator. The concatenator 42 can either concatenate the pages (e.g., the image data or extracted features) and then produce a feature vector from the concatenation or may sum or otherwise aggregate the feature vectors of the individual pages. For purposes of this disclosure, the approaches are interchangeable, and the term "concatenation" should be understood to include both. After concatenation, the bipage feature vector may also be normalized by applying standard feature weighting and normalization schemes. The bipage may be stored in memory 14, storage 16, or the document database 30. The categorizer 40 then applies the categorizer model(s) to the new feature vector to produce the bipage score vector denoted as $s_c([x_k x_{k+1}])$. The brackets indicate that the input to the categorizer 40 is the concatenation (or sum) of the pages (or vectors). For the method, each page of the sequence (except the first and last), such as page 54, is covered by a first (left in FIG. 5) bipage 66 and a second (right) bipage 68. Let $s_c([x_k x_{k+1}])$ denote the bipage score of the concatenation of page $x_k$ and page $x_{k+1}$.

Let $b(x_k, x_{k+1})$ denote the probability output by the document boundary detection model 44. This represents the probability that there is a boundary 70 between page $x_k$ (the first page) and page $X_{k+1}$ (the next page). This relationship can be stated in the following ways: the probability that $x_{k+1}$ is the first page of a document, the probability that $x_k$ is the last page of a document, and the probability that $x_k$ and $X_{k+1}$ do not belong to the same document. While all these descriptions of boundary probability (that is, the b(x,y) function) are considered equivalent, they may employ different models for the boundary detector 44, such as a categorizer that has a special category for first pages, a categorizer that has a special category for last pages, and a measure of topical/lexical similarity between two successive pages. These models could be merged, for example summing the weighted the scores of each model, into one combined document boundary detection model. The exemplary boundary detector model is applied by the boundary detector 44 (using processor 10) which takes two pages as input and outputs a non-binary probability, e.g., scaled to a range between 0 and 1, with higher values indicating that a boundary between $x_k$ and $x_{k+}$, is more likely and values closer to 0 indicating that the pages are more likely to be from the same document. In the method, the probability output by the boundary detector is used to weight the category scores of the neighboring pages. In the exemplary embodiment, the bipage category scores are weighted by the probability that the pages are from same document, so in the score function, the boundary detector term may appear as "1−b" rather than as "b". Of course, the boundary detector could return a "same document" probability rather than a boundary probability, and then the term could simply be a function of "b".

Using processor 10, the score refiner 46 applies a scoring function which for each page x which takes the bipage and page score vectors $s_c([x_{k-1}x_k])$, $s_c([x_kx_{k+1}])$, and $s_c(x_k)$, output by the categorizer, and the respective boundary probabilities $b(x_{k-1},x_k)$ and $b(x_k,x_{k+1})$ to generate an initial score for the page. Using diffusion parameters $\alpha$ and $\beta$, the score refiner then iteratively diffuses the bipage category scores of neighboring bipages to the current page. As will be appreciated, in this process, the score vector of the current page 54 is influenced by the score vectors of the neighboring pages 52, 58 with which it forms bipages. When the score vectors of pages 52, 58 are changed, due to the influence of pages 58 and 60, then in the next iteration, this modification will be diffused to page 54. The more iterations, the greater the number of pages in the sequence which are able to influence the score of the current page. However, the degree of this diffusion is impacted by the boundary probabilities, giving a greater weight to the bipage score vectors for a current page and lesser weight to the single page score vector when there is a higher probability that the other two pages forming the bipages with the current page come from the same document. In this way, diffusion is "anisotropic," i.e., not uniform, due to the different boundary probabilities.

Any suitable learning method can be used for learning by the categorizer and boundary detector(s). For example, the categorizer may use Probabilistic latent semantic analysis, while the first/last page detectors forming the boundary detector may be logistic regression classifiers. It is to be appreciated that other learning methods may be used, such as Naïve Bayes, Latent Linear Regression, Support Vector Machine (SVM), Artificial Neural Networks, and the like.

Figure 3:
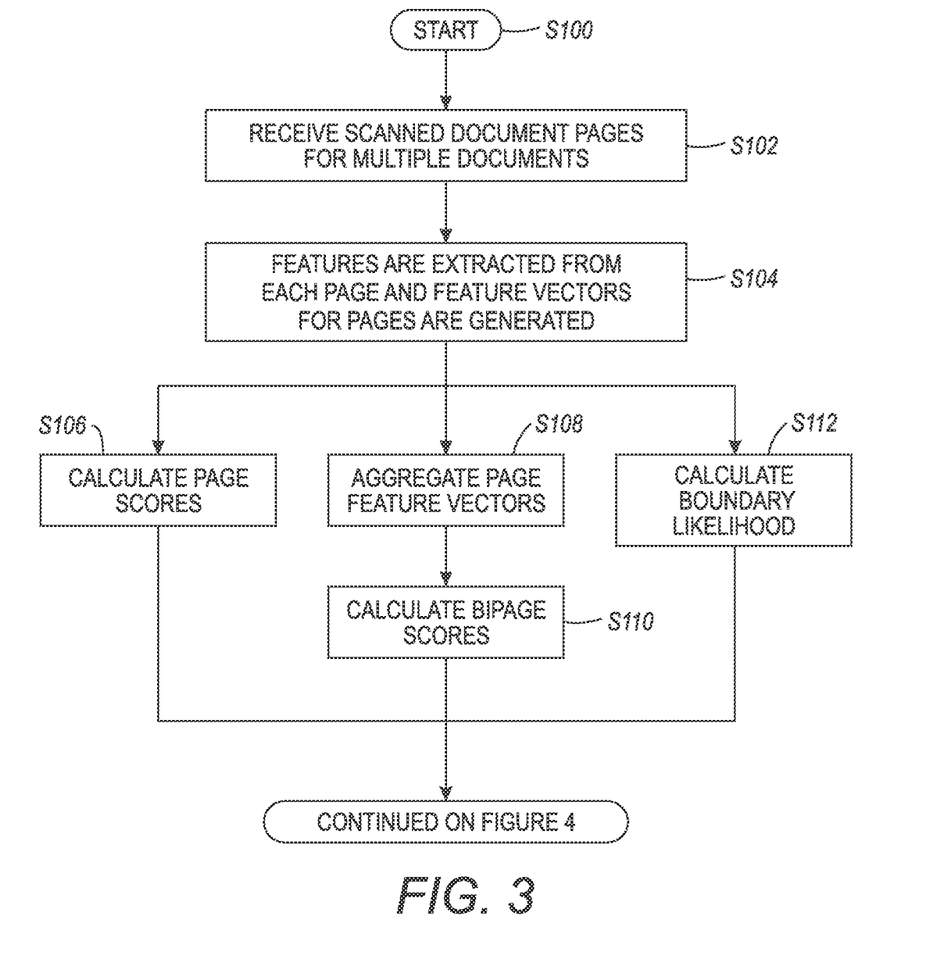
FIGS. 3 and 4 are a flowchart illustrating a categorization method according to another aspect of the exemplary embodiment.
Figure 4:
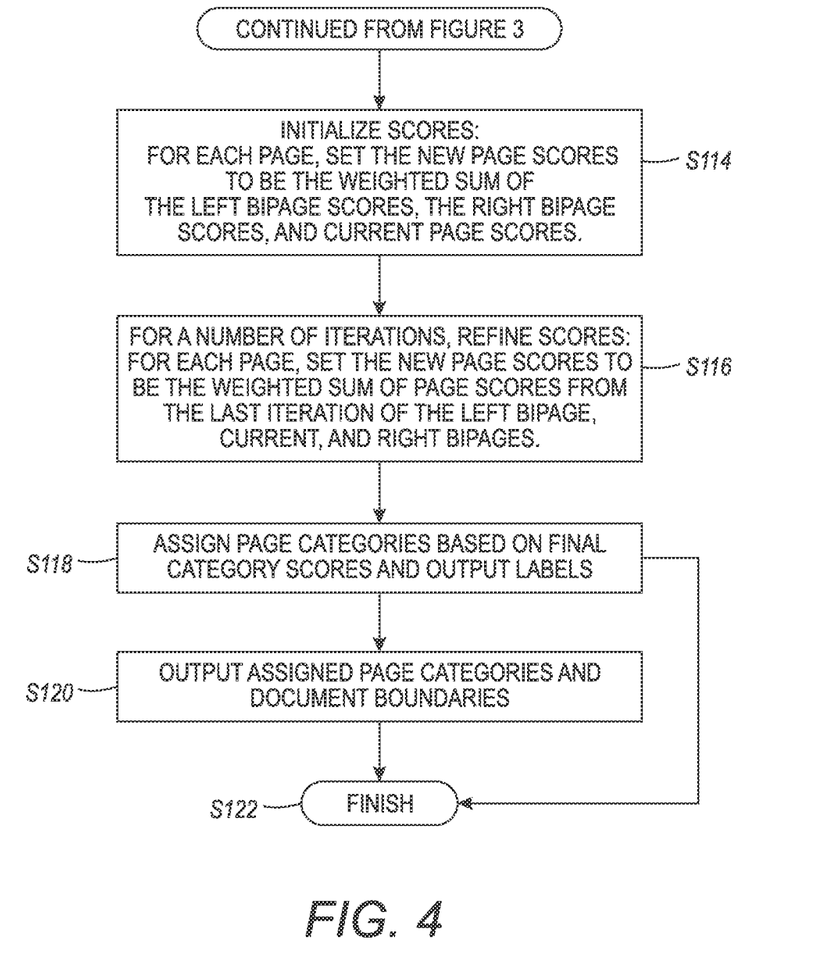

FIGS. 3 and 4 illustrate a categorization method which may be performed with the exemplary system 1 using processor 10. The method starts at step S100. In S102, a sequence of scanned pages to be categorized is received into local document repository 48 in storage 14 from the document database 30.

At S104, features are extracted from each page and page feature vectors are generated based thereon, by the representation generator 38.

At S106, page score vectors are computed by the categorizer 40 for the individual pages based on the page representations.

At S108, bipage feature vectors are generated by the concatenator 42, e.g., by aggregating the page feature vectors.

At S110, bipage score vectors are computed by the categorizer 40 for the bipages based on the bipage representations.

At S112, boundary likelihoods (probabilities) are calculated, respectively, by the boundary detector. Steps S106, S108, S112 may be performed in any order or in parallel, as shown. Step S110 is performed after S108, but may also be performed in parallel with steps S106 and S112.

Continuing with FIG. 4, the output of steps S106, S110, and S112 is input to the score refiner 46. Steps S114 and S116 correspond to Algorithm 1, shown in TABLE 1 below.

In step S114, an initial score vector is calculated for each page $x_k$ in the sequence of N pages $(x_1, x_2, \ldots, x_N)$ by the score refiner 46, based on the score vectors of the current page, the score vectors of its first and second bipages, the boundary probabilities for these bipages and diffusion parameters.

The score refiner uses processor 10 to apply a diffusion scoring function for at least one and optionally a plurality of iterations. The number r of diffusion iterations may be fixed. In other embodiments, the iterations are continued to convergence or until some other suitable stopping criterion is reached. The score refiner 46 thus takes as input three parameters: two diffusion parameters $\alpha$ and $\beta$ and the fixed number of iterations $\tau$. At each iteration t, t ranging from 1 to $\tau$, an updated score vector $\tilde{s}_c^{(t)}(x_k)$ is calculated, based on the output of the prior iteration (or initialization in the case of the first iteration).

Parameter $\alpha$ is a diffusion parameter which affects the extent to which pages to the left of (before) the current one influence the score of the current page. Parameter $\beta$ is a diffusion parameter which affects the extent to which pages to the right (after) the current one influence the score of the current page. These parameters may be chosen empirically. For example, they can both range from 0.1-0.9, such as from 0.2-0.8, e.g., 0.3-0.7. In some embodiments, $\alpha$ and $\beta$ may have the same values, but, as the method is anisotropic, $\alpha$ and $\beta$ need not be equivalent. That is, the influence of a previous page score on the next page score need not be the same as the influence of the next page score on the previous page. For example, $\alpha$ and $\beta$ may be about 0.4 and 0.6 respectively. The differences in $\alpha$ and $\beta$ can also contribute to the degree of anisotropy of the diffusion.

In the initialization step, (the $0^{th}$ step, S114 of FIG. 4), the score vector $\tilde{s}_c^{(0)}(x_k)$ is initialized with bipage information:

$$\tilde{s}_c^{(0)}(x_k) = \qquad\qquad \text{eq. 1}$$
$$\alpha(1 - b(x_{k-1}, x_k))s_c([x_{k-1}x_k]) + \beta(1 - b(x_k, x_{k+1}))s_c([x_kx_{k+1}]) +$$
$$(1 - \alpha(1 - b(x_{k-1}, x_k)) - \beta(1 - b(x_k, x_{k+1})))s_c(x_k)$$

The three addends of the above equation, the left page addend, the right page addend, and the current page addend, will be explained separately.

Below is the left addend, called so because it is based on the score vector of the bipage formed by the current page and the page to the left (previous page):

$$\alpha(1-b(x_{k-1},x_k))s_c([x_{k-1}x_k])$$

The first two terms of this addend serve as weighting factors and are collectively referred to as the first weighting factor. The $1-b(x_{k-1},x_k)$ boundary probability term weights this addend by the probability that the page on the left is from the same document as the current page. The last portion is the score vector of the concatenation of the page on the left and the current page $x_k$. In short, this addend is a function of the first diffusion parameter α, the left (first) weighting factor, and the left bipage score, which in the exemplary embodiment are multiplied by each other.

Below is the right addend, based on the bipage to the right of (subsequent to) the current page:

$$\beta(1-b(x_k,x_{k+1}))s_c([x_k,x_{k+1}])$$

The term after β weights this addend by the probability that the page on the right is from the same document. The last term is the right bipage score vector. In short, this addend is a function of the second diffusion parameter β, the right bipage boundary probability (collectively these two terms are referred to as the second weighting factor) and the right (second) bipage score vector, which in the exemplary embodiment are multiplied by each other.

Returning to the last term, the current page addend:

$$(1-\alpha(1-b(x_{k-1},x_k))-\beta(1-b(x_k,x_{k+1})))s_c(x_k)$$

This term weights the current page score vector. In order to normalize the output vector $\tilde{s}_c^{(t)}(x_k)$ so that it falls within the same range of values as the input vector $s_c(x_k)$, the coefficients of the three score vectors are arranged to sum to 1. Hence, the total weighting in the third term is "1 minus the first and second weighting factors," which effectively normalizes the resulting score vector within the same range as the input score vectors. The weighting factor for this term will be referred to as the current page weighting factor.

Eq. 1 can thus be stated as "the left bipage score vector weighted by the left weighting factor plus the right bipage score vector weighted the right weighting factor plus the current page score vector weighted by the current page weighting factor." This is the only the initial value, calculated in step S50, although it is contemplated that this level of score refinement may be sufficient for some applications. In such cases, the scores may be stored in memory 14, storage 16, or the document database 30.

After the initialization step S114 is complete, i.e., scores are computed for each page in the sequence, the page scores are iteratively updated, by the refiner 46, in step S116. The following iterated anisotropic diffusion function is repeated by the refiner 46 using processor 10 for t=1, . . . , τ:

$$\tilde{s}_c^{(t)}(x_k) = \alpha(1-b(x_{k-1},x_k))\tilde{s}_c^{(t-1)}(x_{k-1}) + \beta(1-b(x_k,x_{k+1}))\tilde{s}_c^{(t-1)}(x_{k+1}) + (1-\alpha(1-b(x_{k-1},x_k))-\beta(1-b(x_k,x_{k+1})))\tilde{s}_c^{(t-1)}(x_k) \quad \text{eq. 2}$$

At the end of the iterations, the final refined score vector is $\tilde{s}_c^{(\tau)}(x_k)$ for k=1, . . . , N (that is, a refined score vector is calculated for each page of the N pages input from the document database 30). The diffusion score refiner 46 outputs these improved score vectors, denoted, with the τ omitted, as $\tilde{s}(x_k)$ for the N pages with respect to the K categories. The scores may be output, stored in memory 14, stored in storage 16, or written to the document database 30 with their respective pages or separately.

Eq. 2 is analogous to Eq. 1. However, instead of using left and right bipages, Eq. 2 uses the score of the page to the left or right from the previous iteration. Because the initial step (S114, using Eq. 1) uses the bipages, the score vectors of later iterations are derived from the bipage scores. Eq. 2 can be stated as "the value of the previous iteration of the page to the left weighted by the first weighting factor plus the value of the previous iteration for the page on the right weighted by the second weighting factor plus the value of the previous iteration of this page weighted by the current page weighting factor." Note that the score function has a first (left), second (right), and current page term and that the weighting coefficients are the same as in Eq. 1.

For the first and last pages of the sequence, the above equations are suitably modified to take into account the fact that there is no page on the left for the first page (α is set to 0) and no page on the right for the last page (β is set to 0).

The refined score vectors can then be used to classify and segment the pages. For example, at S118, page categories are assigned to the pages (by the labeler 47), based on the final score vectors. For example, the labeler 47 may assign the most probable category to each page. At S120, the categories may be output, stored in memory 14, stored in storage 16, or written to the document database 30 with their respective pages or separately. Optionally, there may be post output calibration of the new score vectors $\tilde{s}(x_k)$ or boundaries by predetermined calibration procedures in order to decision thresholds to optimize business performance measures.

As will be appreciated, the information 49 output by the system may include one or more of: the final refined category scores, the assigned page categories, the boundary probabilities, and an identification of those pages of the sequence which constitute the document boundaries. This identification may be based on the page categories, category scores, and/or boundary probabilities (which may also be refined, as outlined below).

The method ends at S122.

The algorithm is summarized in TABLE 1.

TABLE 1

Algorithm 1

Input:
    a sequence of N pages to be classified $(x_1, x_2, \ldots, x_N)$,
    a categorizer function $s_c(x)$,
    a document boundary detector b(x,y),
    two diffusion parameters α and β,
    a fixed number of iterations τ.
Output:
    improved score vectors $\tilde{s}(x_k)$ for the N pages with respect to the K categories.
Initialisation with bi-page information:
$\tilde{s}_c^{(0)}(x_k) = \alpha(1-b(x_{k-1},x_k))s_c([x_{k-1}x_k]) + \beta(1-b(x_k,x_{k+1}))s_c([x_kx_{k+1}]) + (1-\alpha(1-b(x_{k-1},x_k))-\beta(1-b(x_k,x_{k+1})))s_c(x_k)$
Iterated anisotropic diffusion:
FOR t = 1,...,τ DO:
$\tilde{s}_c^{(t)}(x_k) = \alpha(1-b(x_{k-1},x_k))\tilde{s}_c^{(t-1)}(x_{k-1}) + \beta(1-b(x_k,x_{k+1}))\tilde{s}_c^{(t-1)}(x_{k+1}) + (1-\alpha(1-b(x_{k-1},x_k))-\beta(1-b(x_k,x_{k+1})))\tilde{s}_c^{(t-1)}(x_k)$
END FOR
return:
    $\tilde{s}_c^{(\tau)}(x_k)$ for k = 1,...,N.

The method illustrated in FIGS. 3 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for categorizing pages.

In practice, the choice of τ depends on the distribution of the number of pages for the documents in the collection and can be determined experimentally. In one embodiment, τ is fixed to the median value of the document length in pages, while α and β may depend on the choice of τ. In general, their values are generally lower for larger values of τ. Their values can be tuned on a training set or based on cross-validation, for a fixed τ.

As an example, consider the category score vectors 80 and document boundary probabilities b for the example pages illustrated in FIG. 5. Assume that the bipage scores are the average of the two page scores. In the initialization, first iteration, the category scores from page 52 are diffused to page 54, thus, for example, the second category score of 0.3 is increased slightly as the score for that category on page 52 is somewhat higher. The scores from page 54 are diffused much less to page 58 because there is a relatively high probability of there being a boundary between the two pages (output by the boundary detector).

Once the iterations are complete, the boundary probabilities may be refined, based on the refined page category scores. For example, the probability of a boundary may be increased if the two pages of a bipage now have less similar category score vectors 80 than were originally assigned.

Without intending to limit the scope of the exemplary embodiment, the following examples demonstrate the applicability of the method.

EXAMPLES

To assess the performance of the proposed method, it was applied to a test collection of 26,856 pages, representing 6,845 application form documents, which were grouped into 117 batches. The document average length was 3.92 pages with a median length of 2 pages. The test pages were annotated with labels based on a domain taxonomy which uses about 150 different categories. The true document boundaries were known but not used when applying the method. Batch boundaries were used, which is realistic as batch boundaries generally coincide with document boundaries. A traditional cross-validation setting was used, in which the 117 batches were divided into 5 sets of approximately the same size (in number of pages). For each of the 5 possible permutations, training was done on 4 sets and testing done on the remaining set. Training consisted of both building a doctype categorization model over the 150 categories and in building a document boundary detector. For testing, the boundary detector was a combination of a first page categorizer that models what a first page looks like independently of its doctype category, a last page categorizer, and two dissimilarity measures between a pair of consecutive pages. One dissimilarity measure was based on the Bhattacharyya divergence between doctype probability scores of the pages and the other was based on the cosine measure between the weighted bag-of-word representations of the two pages. The doctype categorizer was a Probabilistic latent semantic analysis (PLSA)-based categorizer, while the first/last page detectors were logistic regression classifiers.

Two standard doctype categorizers were used for comparison: a doctype categorization model and a factorial HMM method. The doctype categorization model was applied to each page individually, as is usually done. This model was used as the baseline method.

The factorial HMM modeled the pages as a double sequence of hidden states that emit the page content. The two sequences were the doctype states and the "first page/non first page" states. In other words, the model used a pair of hidden states $(z_k,f_k)$, where $z_k$ is the (hidden) doctype of page $x_k$ and $f_k$ is a binary hidden state indicating whether the page $x_k$ is a first page ($f_k=1$) or not ($f_k=0$). Transition probabilities from $(z_k,f_k)$ to $(z_{k+1},f_{k+1})$ have the property that, if two successive pages $(x_k,x_{k+1})$ belong to the same document ($f_k=0$), then $z_k$ and $z_{k+1}$ should be the same. Inside a document and, consequently, inside a category z, the sequence of $f_k$ states is modelled by a two-state Markov chain (one chain for each category) whose transition probabilities are computed from smoothed counts such as the proportion of one-page documents, assuming a geometric distribution of the document length (in number of pages). Here, it is assumed that, as soon as the document changes, there is a uniform probability of going from one doctype to another one. The Forward-Backward algorithm is used to compute the marginal category probabilities for each page, given all observations in a batch. In order to keep tractability in the Forward-Backward algorithm, the extra simplification that $p(f_k,z_k|x_k)=p(f_k|x_k) \cdot p(z_k|x_k)$ was added when computing the emission probabilities (with the Bayes theorem).

The methods were compared using conventional business performance measures, which are the recall values for two high levels of precision, 98% and 99% (P@98, P@99). These measures represent the percentage of pages in a stream that could be recognized with high confidence (precision guaranteed to be higher than 98% or 99%) and filtered out of the stream. The remaining part of the stream would be processed manually. This evaluates the categorization models on the basis of their "high score" range, as opposed to AUC or MAP-like measures that cover the whole range of score values. Table 1 shows the results.

TABLE 1

Business Performance Measures: Comparisons of Different Algorithms

|  | P@98 | R@98 | F@98 | P@99 | R@99 | F@99 |
| --- | --- | --- | --- | --- | --- | --- |
| Base Line | 0.985 | 0.6491 | 0.7825 | 0.9918 | 0.439 | 0.6086 |
| Diffusion | 0.9861 | 0.6771 | 0.8029 | 0.9929 | 0.4775 | 0.6449 |
| τ = 0, α = 0.4, β = 0.6 | | | | | | |
| Diffusion | 0.9849 | 0.702 | 0.8197 | 0.9923 | 0.6041 | 0.751 |

TABLE 1-continued

Business Performance Measures: Comparisons of Different Algorithms

|  | P@98 | R@98 | F@98 | P@99 | R@99 | F@99 |
|---|---|---|---|---|---|---|
| $\tau = 1, \alpha = 0.4, \beta = 0.6$ Diffusion | 0.984 | 0.7121 | 0.826 | 0.992 | 0.606 | 0.7526 |
| $\tau = 2, \alpha = 0.4, \beta = 0.6$ Diffusion | 0.9851 | 0.7033 | 0.8207 | 0.9924 | 0.6058 | 0.7524 |
| $\tau = 3, \alpha = 0.4, \beta = 0.6$ Diffusion | 0.9847 | 0.709 | 0.8245 | 0.9924 | 0.6048 | 0.7516 |
| $\tau = 2, \alpha = 0.4, \beta = 0.5$ Diffusion | 0.9847 | 0.7102 | 0.8252 | 0.9922 | 0.6035 | 0.7505 |
| $\tau = 2, \alpha = 0.4, \beta = 0.4$ PBD | 0.9871 | 0.7254 | 0.8363 | 0.9929 | 0.6343 | 0.7741 |
| $\tau = 3, \alpha = 0.4, \beta = 0.6$ Factorial HMM | 0.9857 | 0.6806 | 0.8052 | 0.9926 | 0.5818 | 0.7336 |

Table 1 compares the different algorithms using five different metrics. For business users, the significant recall metrics are R@98 and R@99, corresponding to coverage with a guaranteed precision of 98% and 99%, respectively. The P@98 and P@99 metrics are used only to check that the desired levels are indeed reached. The F@98 and F@99 metrics give the corresponding F1-values. PBD (Perfect Boundary Detector) corresponds to using a perfect document boundary detector—an ideal, limit case. That is, b(x,y) is 1 if x and y belong to the same document. A number of observations can be drawn from this table.

First, the optimal parameter values are $\tau=2$ (which corresponds to the median document length in the collection), $\alpha=0.4$, and $\beta=0.6$. This suggests that the diffusion should not be symmetric in the two directions of the chain. The exemplary method allows the system to gain 10% (relative) in coverage for a precision of 98% and to gain 38% (relative) at a precision of 99%. This improvement can lead to dramatic profits, as the system is typically processing millions of pages and the cost of manually reviewing one page can be around $0.40, or more.

Second, there is a significant improvement from iterating the diffusion process, as shown by the differences between $\tau=0$ and $\tau=2$, but it is not necessary, and perhaps even detrimental, to wait for convergence of the diffusion process. That is, there is little gain at $\tau=3$.

Third, for the optimal value of $\tau$ (median document length), the optimum values of $\alpha$ and $\beta$ are quite flat, as shown by the results for $\beta=0.5$ and 0.4.

Fourth, as shown by comparing the "PBD" results to the optimal parameters, a better boundary detector might provide some improvement.

Last, the factorial HMM approach, even when using more parameters (e.g., different transition probabilities for each category of the 2-state first-page/non-first-page Markov chains), does not provide better results. One possible reason for this is that, even if category probability estimates are better in general, they are not necessarily better in the "high probability" range which is useful for business needs.

It may be noted that anisotropic diffusion has been used in computer vision as a way to smooth images and reduce noise. See D. Barash, "Bilateral filtering and anisotropic diffusion: Towards a unified viewpoint," Scale-Space and Morphology in Computer Vision Proc. Third International Conference, Jul. 7-8, 2001, vol. 2106, Lecture Notes in Computer Science, pp. 273-280, Springer 2001. See also D. Barash, "A fundamental relationship between bilateral filtering, adaptive smoothing, and the nonlinear diffusion equation," IEEE Trans. Pattern Analysis and Machine Intelligence, 24(6):844-847, June 2002. Anisotropic diffusion in an image differs from the present method in several respects. First, image smoothing is performed directly on the features of the image, not on class predictions, and is therefore used only to reduce noise, not to improve categorization results of adjacent pages. Additionally, smoothing an image is performed in 2D so that propagation goes not only from left-right, but also up-down.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer implemented categorization method comprising:
    receiving a sequence of pages to be categorized;
    for each of a plurality of pages in the sequence as a current page:
        computing a page category score for each of a set of categories for the current page;
        computing a first bipage category score for each of the set of categories for a first bipage comprising a preceding page and the current page;
        computing a second bipage category score for each of the set of categories for a second bipage comprising a subsequent page and the current page;
        computing a first boundary probability that there is a document boundary between the preceding page and the current page; and
        computing a second boundary probability that there is a document boundary between the subsequent page and the current page;
    with a computer processor, for at least one iteration, for each of the plurality of pages, computing a refined page category score for each of the set of categories for the current page as a function of:
        the first bipage category scores weighted by a first weighting factor, the first weighting factor being based on the first boundary probability;
        the second bipage category scores weighted by a second weighting factor, the second weighting factor being based on the second boundary probability; and
        the page category scores of the current page; and
    outputting information based on the refined page category scores for each of the plurality of pages.

2. The method of claim 1, wherein, for at least a second iteration, the computing of the refined page category scores for each of the set of categories for the current page comprises computing further refined page category scores based on the previously-computed refined page category scores for each of the set of categories and the first and second boundary probabilities.

3. The method of claim 2, wherein the computing of the further refined page category scores comprises:
  computing refined page category scores for each of the set of categories for the current page as a function of:
    the prior computed refined category scores for the previous page weighted by the first weighting factor;
    the prior computed refined category scores for the subsequent page weighted by the second weighting factor; and
    the prior computed refined page category scores of the current page.

4. The method of claim 2, wherein a number of the iterations is a function of an expected median length of the documents.

5. The method of claim 1, wherein the category scores of the current page are computed by applying a model to a representation of the current page based on at least one of textual and image content of the current page.

6. The method of claim 1, further comprising outputting a category for each of the plurality of pages based on the refined page category scores.

7. The method of claim 1, wherein the first weighting factor is a function of a first diffusion parameter and the second weighting factor is a function of a second diffusion parameter.

8. The method of claim 7, wherein the second diffusion parameter is different than the first diffusion parameter.

9. The method of claim 7, wherein the first and second diffusion parameters are less than 1.

10. The method of claim 7, wherein at least one of the first and second diffusion parameters is in the range 0.3 to 0.7.

11. The method of claim 1 wherein at least one of the computing steps is performed by a processor.

12. The method of claim 1 wherein the set of categories comprises a plurality of categories.

13. The method of claim 1, wherein the output information comprises an assignment of a single category from the set of categories for each page.

14. The method of claim 1, wherein the output information comprises at least one of:
  boundary probabilities for the sequence of pages; and
  an identification of pages that constitute document boundaries.

15. A categorization system comprising:
  memory which stores instructions for:
    receiving a sequence of pages to be categorized;
    for each of a plurality of pages in the sequence as a current page:
      computing a page category score for each of a set of categories for the current page;
      computing a first bipage category score for each of the set of categories for a first bipage comprising a preceding page and the current page;
      computing a second bipage category score for each of the set of categories for a second bipage comprising a subsequent page and the current page;
      computing a first boundary probability that there is a document boundary between the preceding page and the current page; and
      computing a second boundary probability that there is a document boundary between the subsequent page and the current page;
    for at least one iteration, for each of the plurality of pages, computing a refined page category score for each of the set of categories for the current page as a function of:
      the first bipage category scores weighted by a first weighting factor, the first weighting factor being based on the first boundary probability;
      the second bipage category scores weighted by a second weighting factor, the second weighting factor being based on the second boundary probability; and
      the page category scores of the current page; and
    outputting information based on the refined page category scores for each of the plurality of pages; and
  a processor in communication with the memory for executing the instructions.

16. A computer program product comprising a non-transitory medium storing instructions, which when executed by a computer, perform a method comprising:
  receiving a sequence of pages to be categorized;
  for each of a plurality of pages in the sequence as a current page:
    computing a page category score for each of a set of categories for the current page;
    computing a first bipage category score for each of the set of categories for a first bipage comprising a preceding page and the current page;
    computing a second bipage category score for each of the set of categories for a second bipage comprising a subsequent page and the current page;
    computing a first boundary probability that there is a document boundary between the preceding page and the current page; and
    computing a second boundary probability that there is a document boundary between the subsequent page and the current page;
  for at least one iteration, for each of the plurality of pages, computing a refined page category score for each of the set of categories for the current page as a function of:
    the first bipage category scores weighted by a first weighting factor, the first weighting factor being based on the first boundary probability;
    the second bipage category scores weighted by a second weighting factor, the second weighting factor being based on the second boundary probability; and
    the page category scores of the current page; and
  outputting information based on the refined page category scores for each of the plurality of pages.

17. A computer-implemented document categorization system comprising:
  a categorizer which computes a page category score for each of a set of categories for each page of a plurality of pages, based on a digital representation of the respective page;
  a concatenator which concatenates representations for successive pairs of the plurality of pages for generating a bipage category score for each of the set of categories for each bipage of a plurality of bipages, where each page other than the first is part of a preceding bipage and each page other than the last is part of a subsequent bipage;
  a boundary detector which computes a boundary probability for successive pairs of the plurality of pages such that each page other than the first has a preceding boundary probability between the page and its preceding page and each page other than the last has a subsequent boundary probability between the page and its subsequent page;

a score refiner which, for at least one iteration, computes a refined page category score for each of the set of categories for each page P of the plurality of pages as a function of:
  the bipage category scores of the preceding bipage of P weighted by a first weighting factor, the first weighting factor being based on the preceding boundary probability of page P;
  the bipage category scores of the subsequent bipage of P weighted by a second weighting factor, the second weighting factor being based on the subsequent boundary probability of page P; and
  the page category scores of the page P,
  the system outputting information based on the refined page category scores for each of the plurality of pages; and
a processor which implements at least one of the concatenator, categorizer, boundary detector, and score refiner.

18. The system of claim 17, further comprising:
a document repository which stores the digital representations for retrieval by at least one of the categorizer and the boundary detector.

19. The system of claim 17, further comprising:
a representation generator which generates the digital representations and stores them in memory.

20. The system of claim 17, wherein the information concatenated by the concatenator comprises one of category scores and digital representations for bipages.

* * * * *